UNITED STATES PATENT OFFICE 2,046,541

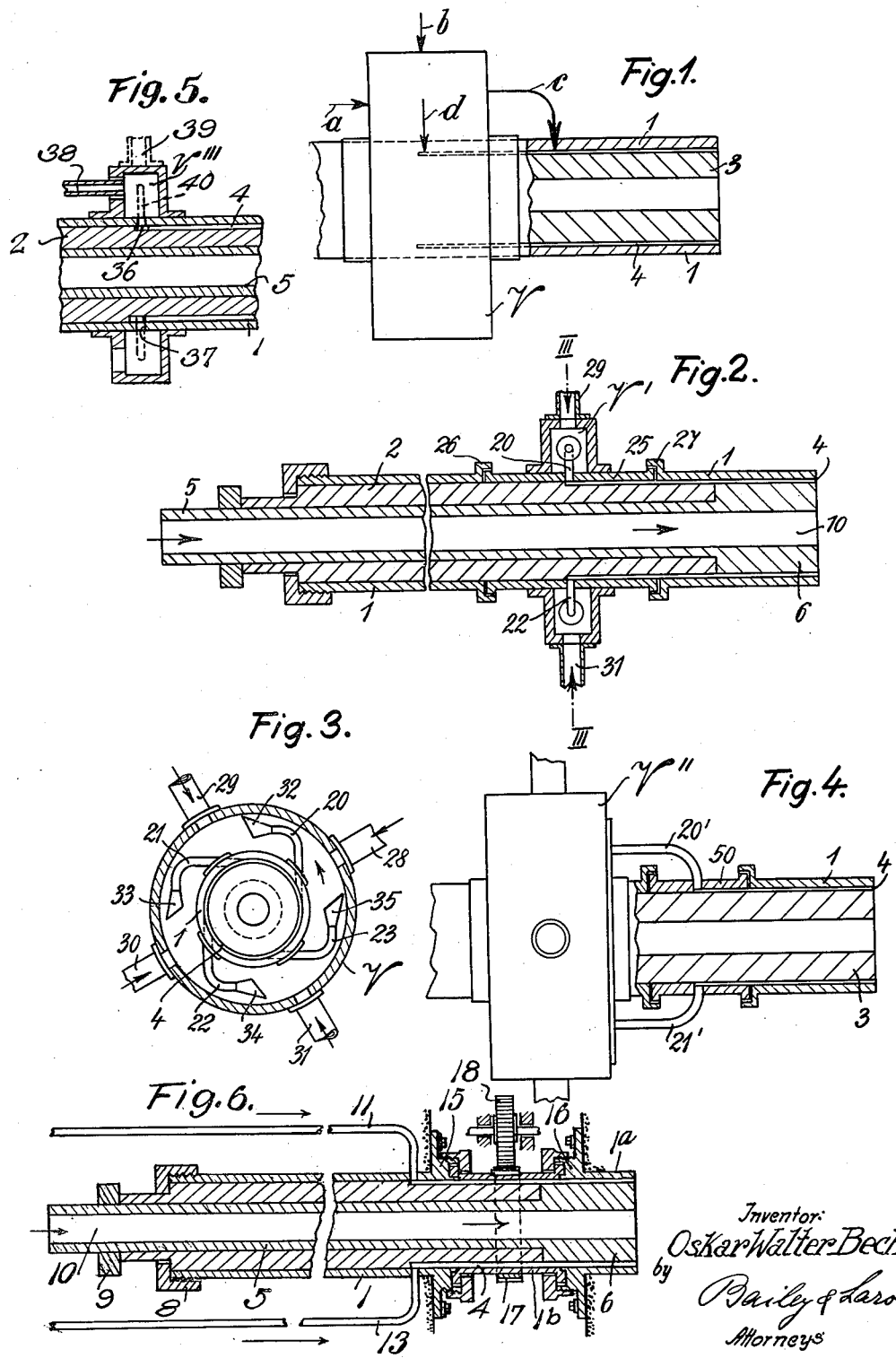

DEVICE FOR PRODUCING ARTIFICIAL SAUSAGE SKINS FROM PASTY FIBROUS MASSES OF ANIMAL OR VEGETABLE ORIGIN

Oskar Walter Becker, Hamburg, Germany, assignor to firm Naturin Gesellschaft mit beschrankter Haftung, Weinheim-B., Germany Application October 23, 1933, Serial No. 694,902
In Germany June 4, 1932

12 Claims. (Cl. 18—14)

This invention relates to a device for producing artificial sausage skins from pasty fibrous masses of animal or vegetable origin extruded through annular nozzles and fed to the latter in a special manner.

In the known devices these pasty or plastic masses are fed for instance by means of little tubes which open into the annular space of the nozzles and are connected with pipings into which the plastic mass is introduced under pressure.

It has been found that it may be particularly advantageous to provide directly on or around the annular nozzle a supply vessel whence the plastic mass is conveyed under pressure to the annular nozzle space which is preferably in direct communication with the supply vessel, e. g. by small tubes passing through the tubular casing of the nozzle or by means of slits or other apertures in the tubular casing. The invention further deals with the arrangement and form of the tubes serving for conveying the mass from the supply vessel to the annular space of the nozzles, with their connection to the nozzle casing as well as with particularly advantageous forms of the annular nozzles themselves.

By way of example, several embodiments of the invention are diagrammatically illustrated in the accompanying drawing, in which Figure 1 is a side view, partly in section, of the device, the arrows indicating feeding possibilities; Fig. 2, a sectional view of another construction; Fig. 3, a cross section on the line III—III, of Fig. 2; Fig. 4, a sectional view of another construction; Fig. 5, a sectional view of a part of still another construction; and Fig. 6, a view of another construction with particular characterization of the conditions of motion existing with respect to the casing and core.

For the sake of clearness, the outlet end of the annular nozzle in Fig. 1 is shown in section. I is the tubular casing of the nozzle and contains the hollow core 3 between which and the casing I the annular space 4 is formed which receives the plastic mass for the production of artificial sausage skins and in which this mass is formed into a tubular structure by rearranging a portion of the fibers. The sausage skin comes out of the annular space 4 in the form of an endless tube.

According to the invention, a supply vessel V is arranged as closely as possible to the annular nozzle and near the annular space 4, into which the plastic mass is introduced and whence it passes under pressure into the annular space 4. The supply vessel V may be arranged near the annular nozzle in any desired manner, e. g. in such a way as to be in communication with the annular space 4 only by means of supply tubes or the like and without being directly connected with the nozzle, though the construction shown in the drawing where the supply vessel V surrounds the annular nozzle is preferred, since it permits the best solution of the problem of conveying the plastic mass from the supply vessel to the annular space.

There are several possibilities of introducing the plastic mass into the vessel V and conveying it to the annular space 4. Referring to Fig. 1, the plastic mass may be fed to the vessel V from the side, as indicated by the arrow a, or from the circumference, according to the arrow b. Supply to the annular space 4 may take place outside the casing, as suggested by arrow c, by means of small tubes o or the like connected to a side wall of the annular space 4, or it may be effected completely inside the vessel V, according to arrow d, in which case an annular slit, which may be subdivided, replaces the tubes.

Figs. 2 and 3 show a constructional form, in which the core of the nozzle is formed by a part 6 which leaves the annular space 4 clear between itself and the casing I and which has at its rear end a reduced portion 5. A bore 10 passes through the part 5, 6, and the part 5 carries inside the casing I a member 2 which is reduced for a certain distance on the side facing the part 6 so as to form again the annular channel 4. The casing I is subdivided, and between both parts I an intermediate piece 25 is inserted which is guided on the part 2 and forms a part of the casing. The swellings 26, 27 insure tight closure between the parts I and the part 25 which, approximately in its center, carries suitable pieces of pipe 20, 21, 22 and 23 which are arranged in the manner shown in Fig. 3 and which pass through the walls of member 25 so as to be in communication with the end of the annular space 4. The pieces of pipe or little tubes 20, 21, 22, 23, whose front ends may be provided with hoppers 32, 33, 34 and 35 in the manner shown in Fig. 3, are disposed inside the supply vessel V' to which plastic mass is fed by correspondingly arranged pipings 28, 29, 30, 31. Furthermore, the part 25 is connected with a drive, not shown, so that the member 25 can rotate to allow the tubes 20, 21, 22, 23 to fill their funnels 32, 33, 34, 35 with the mass contained in the vessel V'. Therefore, during the rotation of the part 25 the plastic mass is conveyed under pressure to the annular space 4, so that it can be extruded therefrom in the form of a tubular structure.

It is of course possible also to keep the part 25 stationary while the supply vessel V' rotates, provided corresponding means for supplying the plastic mass are arranged, or the casing 1 may rotate with respect to the stationary core piece 6 or the motion is vice versa so that the part 6 rotates while the casing 1 remains stationary.

Fig. 4 indicates another construction corresponding more to the form shown in Fig. 1. There is a core 3 which rotates inside the casing 1. The plastic mass is fed from the supply vessel V'' through the tubes 20', 21', 22', 23' which open into a part 50 connected to the casing 1 and rotatable on the core 3 in such a way that the mass is supplied again to the annular space 4. In this case, a portion of the side walls of the supply vessel V'' in which the tubes are inserted must be rotatable. Filling of the tubes with plastic mass is effected in the manner described above.

The plastic mass may further be fed to the annular space 4 directly from the supply vessel by means of suitable openings, such as slits or the like, as shown in Fig. 5. The nozzle is of the same construction as the nozzle shown in Fig. 2. Inside the supply vessel V''' and directly in the casing 1 the slits 36 and 37 are provided through which the mass can pass from the vessel V''' to the annular space 4. In this case, the plastic mass may be introduced into the vessel V''' from the side by means of a piping 38. Instead of providing several slits in the casing 1 a single annular slit may be substituted.

In forming the sausage skin it is advantageous if, for instance, the supply vessel remains stationary or rotates. The outer casing of the nozzle may also remain stationary, in which case the core of the annular nozzle rotates partly or wholly, or the core may stand still and the casing rotate about the longitudinal axis of the nozzle. It is further possible to let both parts move in opposite directions or to impart to one part an oscillatory motion, so that there are many possibilities of motion. When the casing rotates wholly or partly about the stationary core, it is advisable to stop the portion of the casing near the nozzle outlet while the rotary portion of the casing may be arranged for instance between the stationary portion of the casing and the tubes opening into the annular space of the nozzle and serving for supplying the fibrous pasty mass. Such an arrangement is shown in Fig. 6. The construction of the nozzle is practically the same as that shown in Fig. 2, and the front part of the casing is formed by the part 1a which is firmly connected with a suitable support. 8 is a cap nut and 9, a ring for adjusting the nozzle parts relative to one another. The pasty mass is supplied to the annular space 4 by suitable pipings 11 and 13 which lead either to a distant supply vessel or to one directly connected with the nozzle. The pipings 11 and 13 open into the rear stationary part of the casing 1, and between the two stationary parts 1 and 1a of the casing the rotary part 1b is disposed. Suitable swellings are designated 15 and 16 which pack the joints 1 and 1a and in which the part 1b is guided by corresponding counterparts. A toothed wheel 17 is keyed onto the part 1b approximately in the center thereof and in mesh with, and rotated by, a companion wheel 18. Only the part 1b of the casing moves therefore, the manner of its motion being immaterial like that of other parts. In any case, by the invention all possible and practically feasible combinations of the stationary or rotating parts are to be covered.

At any rate, the motion of the corresponding parts insures good felting of the various layers of fiber and this effect is especially attained by oscillatory motion.

The term "nozzle" as used in the specification and claims is intended to designate the arrangement which includes the core sections 2 and 6 and the casing sections 1, 1 and 25, in Fig. 2 for instance, and the corresponding parts in the other figures. The term "freely rotatable" is intended to define ordinary rotation not accompanied by any axial movement, as distinguished from the restricted rotation which is in a sense possible between two threadedly connected parts.

I claim:

1. An apparatus for making sausage casings of animal or vegetable material from a plastic kneadable mass, comprising a tubular housing, a core positioned within said housing, one end of said core being smaller than the inner diameter of said housing in order to form an annular space, and means for leading plastic material into said annular space, said core being stationary and at least a portion of that part of the housing which surrounds said annular space being freely rotatable.

2. An apparatus for making sausage casings of animal or vegetable material from a plastic kneadable mass, comprising a tubular housing, a core positioned within said housing, one end of said core being smaller than the inner diameter of said housing in order to form an annular space, and means for leading plastic material into said annular space, said core being stationary, the end portion of said housing and the portion thereof at the point of said leading in means being stationary, and a portion of the housing between said last two portions being rotatable.

3. An apparatus for making sausage casings of animal or vegetable material from a plastic kneadable mass, comprising a tubular housing, a core positioned within said housing, one end of said core being smaller than the inner diameter of said housing in order to form an annular space, a supply receptacle mounted around said housing and having a chamber of which the housing forms the inner wall, and means to connect said receptacle and said annular space.

4. An apparatus for making sausage casings of animal or vegetable material from a plastic kneadable mass, comprising a tubular housing, a core positioned within said housing, one end of said core being smaller than the inner diameter of said housing in order to form an annular space, said core and housing being mounted for relative free rotary movement between at least portions of the parts thereof which define said annular space, a supply receptacle mounted around said housing, and means to connect said receptacle and said annular space.

5. An apparatus for making sausage casings of animal or vegetable material from a plastic kneadable mass, comprising a tubular housing, a core positioned within said housing, one end of said core being smaller than the inner diameter of said housing in order to form an annular space, a supply receptacle mounted around said housing, and means to connect said receptacle and said annular space, comprising at least one tube extending into said receptacle and connected to said annular space.

6. An apparatus for making sausage casings of animal or vegetable material from a plastic kneadable mass, comprising a tubular housing, a core positioned within said housing, one end of said core being smaller than the inner diameter of said housing in order to form an annular space, a supply receptacle mounted around said housing, and means to connect said receptacle and said annular space, comprising at least one tube extending into said receptacle and connected to said annular space, said tube being mounted for relative rotary movement around the axis of said housing.

7. An apparatus for making sausage casings of animal or vegetable material from a plastic kneadable mass, comprising a tubular housing, a core positioned within said housing, one end of said core being smaller than the inner diameter of said housing in order to form an annular space, a supply receptacle mounted around said housing, and means to connect said receptacle and said annular space, comprising at least one tube extending into said receptacle and connected to said annular space, said tube being mounted for relative rotary movement around the axis of said housing, said tube having an opening facing in the direction of such relative movement.

8. A device for producing artificial sausage skins from pasty fibrous masses of animal or vegetable origin, comprising an annular nozzle formed of a core and a casing forming an annular space therebetween for extruding the fibrous masses, a supply vessel for the masses surrounding the annular nozzle, an intermediate pipe member forming a part of the casing and angularly rotatable relative to said core, and a plurality of tubes the ends of which are open towards the supply vessel and leading to the annular space formed between the core and the casing.

9. A device for producing artificial sausage skins from pasty fibrous masses of animal or vegetable origin, comprising an annular nozzle formed of a core and a casing forming an annular space therebetween for extruding the fibrous masses, a supply vessel for the masses surrounding the annular nozzle, an intermediate pipe member forming a part of the casing and partly disposed within the supply vessel, a plurality of tubes arranged inside the vessel in the said intermediate member, said tubes extending with their open ends into the supply vessel and leading to the annular space formed between the core and casing, the core of the annular nozzle being rotatable.

10. In a device according to claim 3, passages in the walls of the housing within the supply receptacle for conveying the masses from the supply receptacle to the annular space formed between the core and the housing.

11. A device according to claim 3, in which at least a portion of said housing is rotatable about its longitudinal axis relative to the stationary core.

12. A device according to claim 3, in which said core and housing form an annular nozzle, parts of which are rotatable in opposite directions.

OSKAR WALTER BECKER.